United States Patent
Fillipi et al.

(10) Patent No.: US 9,984,111 B2
(45) Date of Patent: May 29, 2018

(54) PROCESS METADATA TRIGGERS AND EVENTS

(71) Applicant: Oracle International Corporation, Redwood Shores, CA (US)

(72) Inventors: Steven Fillipi, Aurora, CO (US); Gurbinder Bali, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 447 days.

(21) Appl. No.: 14/681,388

(22) Filed: Apr. 8, 2015

(65) Prior Publication Data

US 2016/0299933 A1    Oct. 13, 2016

(51) Int. Cl.
*G06F 17/30* (2006.01)

(52) U.S. Cl.
CPC .... *G06F 17/30362* (2013.01); *G06F 17/3051* (2013.01); *G06F 17/30377* (2013.01)

(58) Field of Classification Search
USPC ................................................ 707/687, 704
See application file for complete search history.

(56) References Cited

U.S. PATENT DOCUMENTS

| | | | | |
|---|---|---|---|---|
| 8,875,090 B2* | 10/2014 | Fox | ........................... | G06F 9/44 717/101 |
| 8,914,404 B1* | 12/2014 | Kim | .................. | G06F 17/30368 707/717 |
| 9,462,056 B1* | 10/2016 | Protopopov | ........ | H04L 67/2838 |
| 9,515,975 B2* | 12/2016 | Abuelsaad | .............. | H04L 51/20 |
| 9,722,963 B2* | 8/2017 | Abuelsaad | .............. | H04L 51/20 |
| 9,722,964 B2* | 8/2017 | Abuelsaad | .............. | H04L 51/20 |

* cited by examiner

*Primary Examiner* — Kim Nguyen
(74) *Attorney, Agent, or Firm* — Kilpatrick Townsend & Stockton LLP

(57) ABSTRACT

Embodiments of the invention provide systems and methods for implementing process metadata triggers and events. More specifically, embodiments of the present invention allow for process metadata events to be defined and generated, including the program code and interfaces that may define the triggering criteria and actions associated with the events. Certain embodiments include ongoing evaluations of triggering criteria for events, including criteria both internal and external to an enterprise system, and generating new event occurrences based on the evaluations of triggering criteria for events. Events and event occurrences may be tracked and monitored, and programmatic actions may be initiated in response to the creation or modification of an event or an event occurrence, including modification of enterprise system software, generation and transmission of targeted user notifications, the generation and customization of electronic documents, and the like.

20 Claims, 8 Drawing Sheets

| EVENT NAME | DESCRIPTION | ENABLED? | TRIGGER CRITERIA | ACTIONS |
|---|---|---|---|---|
| Event 1 | Monthly enterprise order processing and report generation | Y | ../script1.xml | ../report.vbs |
| Event 2 | Customer monthly statement generation | Y | TimeDate = 1/*/* 02:00 | ../stmt.exe |
| Event 3 | Server software upgrade and security patch management | Y | ../script2.xml | ../patch.exe |
| Event 4 | Automated inventory check and reorder system | Y | DBQUERY1 | DBFunc_1 |
|  |  |  |  |  |

FIG. 6A

| OCCURRENCE IDENTIFER | EVENT | CREATION TIME | STATUS | USER | UPDATED TIME | |
|---|---|---|---|---|---|---|
| Ev4-1 | Event 4 | ... | Selected | User1 | ... | |
| Ev1-1 | Event 1 | ... | Deselected | User2 | ... | |
| Ev3-1 | Event 3 | ... | Completed | User3 | ... | |
| Ev4-2 | Event 4 | ... | Not Selected | --------- | ... | |
| Ev2-1 | Event 2 | ... | Selected | User2 | ... | |
|  |  |  |  |  |  | |

FIG. 6B

PROCESS METADATA TRIGGERS AND EVENTS

BACKGROUND OF THE INVENTION

The operation of the hardware, communications networks, software, and data storage used to support businesses and other organizations is critical to the businesses and organizations that rely on this infrastructure. Such enterprise systems are often the lifeblood of businesses large and small, educational institutions, governmental agencies, and the like. These systems are required to support the needs of the enterprise at the hardware level, to provide internal and external networking needs, to support various software capabilities, and to provide back-end data storage solutions. For an enterprise system to be effective and useful to an organization, it must provide all of these capabilities in a secure, reliable, stable, and scalable infrastructure that offers a high level of performance for users inside and outside of the organization.

There are significant challenges in designing and implementing enterprise systems that meet these needs for businesses and other organizations. For instance, enterprise systems often include various hardware and networking devices having different manufacturers, configured at different times and in different situations, and operating under different conditions in different geographic locations. Many enterprise systems also combine legacy hardware and software systems with newly implemented systems, causing potential issues for capability, security, and reliability. Moreover, many such systems are required to support an enormously diverse set of functionality within their respective enterprises. The hardware, communications networks, software, and data infrastructure of many enterprise systems are responsible for housing and supporting different departments within the enterprise, and providing services for different users (both internal and external to the enterprise) operating different user devices in different networks, and having different roles and levels of access within the system.

BRIEF SUMMARY OF THE INVENTION

Embodiments of the invention provide systems and methods for generating process metadata events and process metadata event occurrences. In certain embodiments, one or more components of an enterprise system may generate an event occurrence object in response to a determination that one or more trigger criteria has occurred. Trigger criteria may include, for example, criteria based on the state of data in one or more databases, criteria based on operational states of hardware, software, or network conditions within an enterprise system, criteria based on data retrieved from external data sources, and/or time-based and schedule-based criteria. A set of users within the enterprise system may be associated with the event occurrence object, and one or more enterprise software applications (e.g., multi-user applications) may be modified to allow the associated users to select the event occurrence via the enterprise software. After a user selects an event occurrence via the enterprise software, the enterprise software may be further modified to prevent other associated users from selecting the event occurrence until the first user has updated, deselected, or resolved the event occurrence object.

In some embodiments, an event occurrence object may be based on a template event having an associated trigger criteria and event actions. A new event occurrence object may be generated in response to a determination that the trigger criteria for an event has occurred. For instance, trigger criteria may include a scheduling criteria as well as one or additional trigger criteria for creating a new event occurrence object, such as a database query or trigger, a hardware operational state, a network status, retrieved external data, etc. In such examples, a process metadata manager may periodically poll the system hardware, network devices, and/or databases at times corresponding to the scheduling criteria, in order to determine when a new event occurrence object should be generated. Additionally, in some cases, a new event occurrence object may be generated in response to a request from an authorized user, whether or not the trigger criteria for the event has occurred.

After an event occurrence object has been created, a selected set of users may be identified to receive notifications of the event occurrence. Notifications may be transmitted to the selected users via enterprise system software, or as direct electronic notifications to various associated user devices. A user may select, or pick-up, an event occurrence by interacting with the enterprise software, after which the event occurrence may be locked and/or hidden from other users. Customized electronic documents may be generated and/or populated to allow the user the user to perform one or more actions associated with the event occurrence, and the user may be provided with additional relevant data (e.g., database records, system diagnostic data, etc.) to assist the user to perform the actions. After the user has picked-up an event occurrence via the enterprise software, the user may subsequently drop the event occurrence, edit the event occurrence, resolve the event occurrence, and/or perform other actions that may directly or indirectly change the status of the event occurrence object. In response to a change in status of an event occurrence object, the process metadata manager may perform additional modifications to the enterprise software, for example, notifying other users or administrators, generating and populating additional electronic documents for the event occurrence, and verifying that certain actions have been completed.

BRIEF DESCRIPTION OF THE DRAWINGS

FIGS. 6A and 6B are example data tables respectively listing a set of illustrative process metadata events and a set of illustrative process metadata event occurrences, according to one or more embodiments of the present invention.

DETAILED DESCRIPTION OF THE INVENTION

Figure 1:
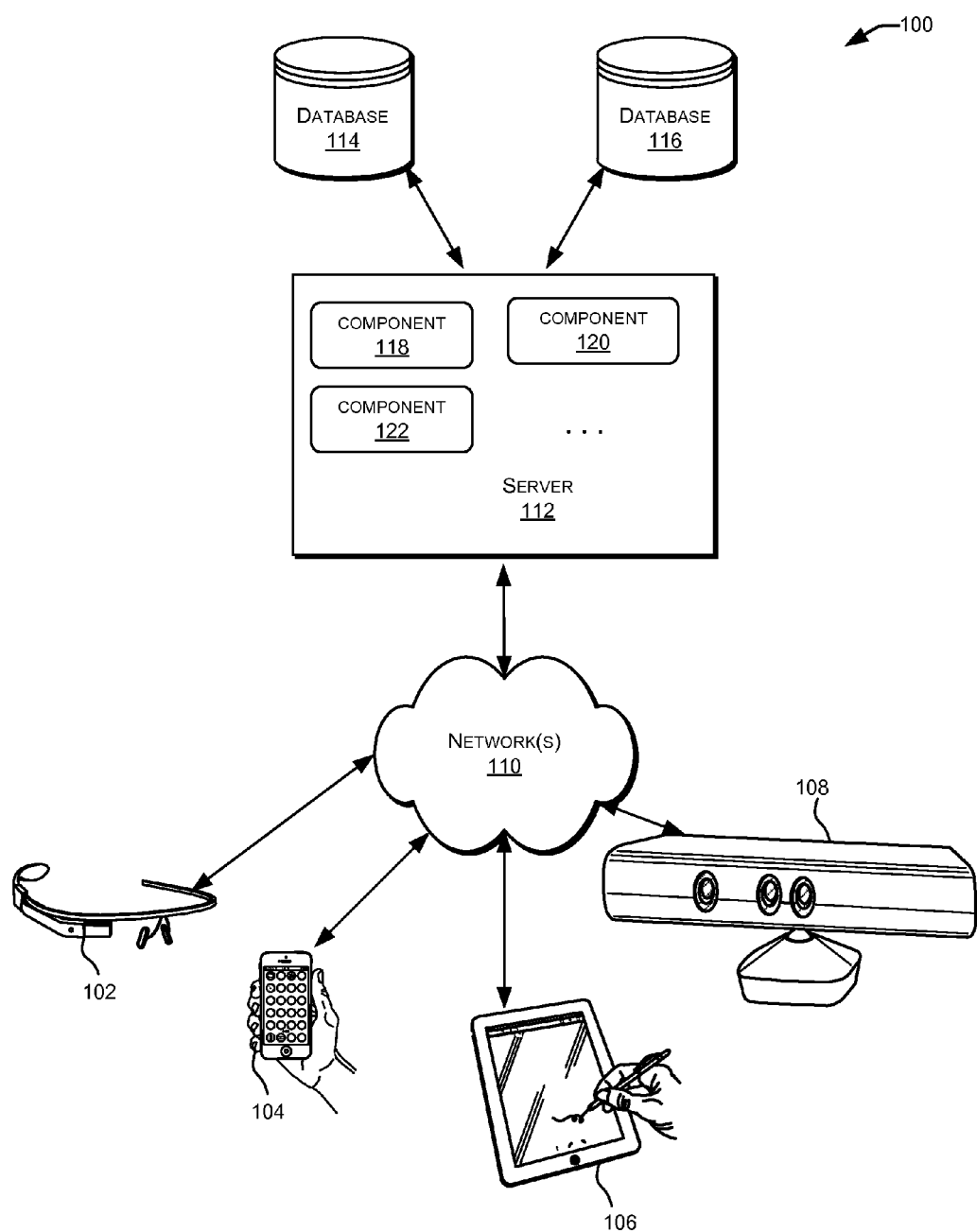
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for implementing process metadata triggers and events. More specifically, embodiments of the present invention allow for process metadata events to be defined and generated, including the program code and interfaces that may define the triggering criteria and actions associated with the events. Certain embodiments include ongoing evaluations of triggering criteria for events, including criteria both internal and external to an enterprise system, and generating new event occurrences based on the evaluations of triggering criteria for events. Such embodiments may be designed and implemented to execute within, or in collaboration with, various types of enterprise software applications, for example, multi-user and/or collaborative applications. Such multi-user or collaborative enterprise software applications may include web-based applications, cloud-based applications, small and medium enterprise (SME) mobile applications, and the like. In some embodiments, the enterprise software applications may include dashboard applications or other reporting/monitoring applications designed to interface with one or more external enterprise systems (e.g., payment systems, tracking systems, accounting systems, enterprise resource planning (ERP) systems, shipping systems, inventory management systems, warehouse management systems, etc.). In other cases, certain enterprise software applications may include multi-process management systems configured to monitor and/or control one or more such external systems. As described herein, events and event occurrences may be tracked and monitored within any of these types of enterprise software applications, and programmatic actions may be initiated in response to the creation or modification of an event or an event occurrence, including modification of enterprise system software, generation and transmission of targeted user notifications, the generation and customization of electronic documents, and the like. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
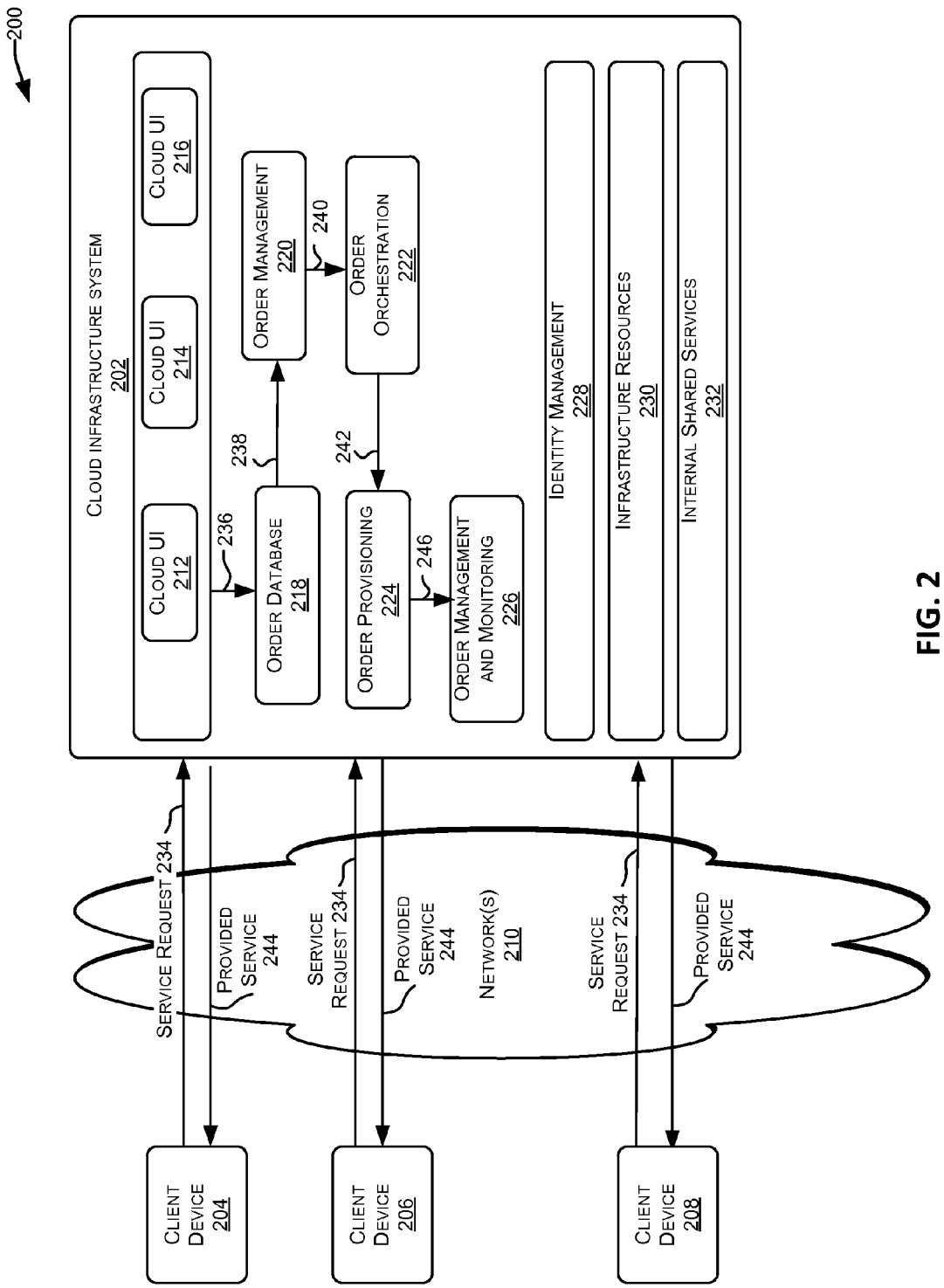
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription model, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Any number of different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
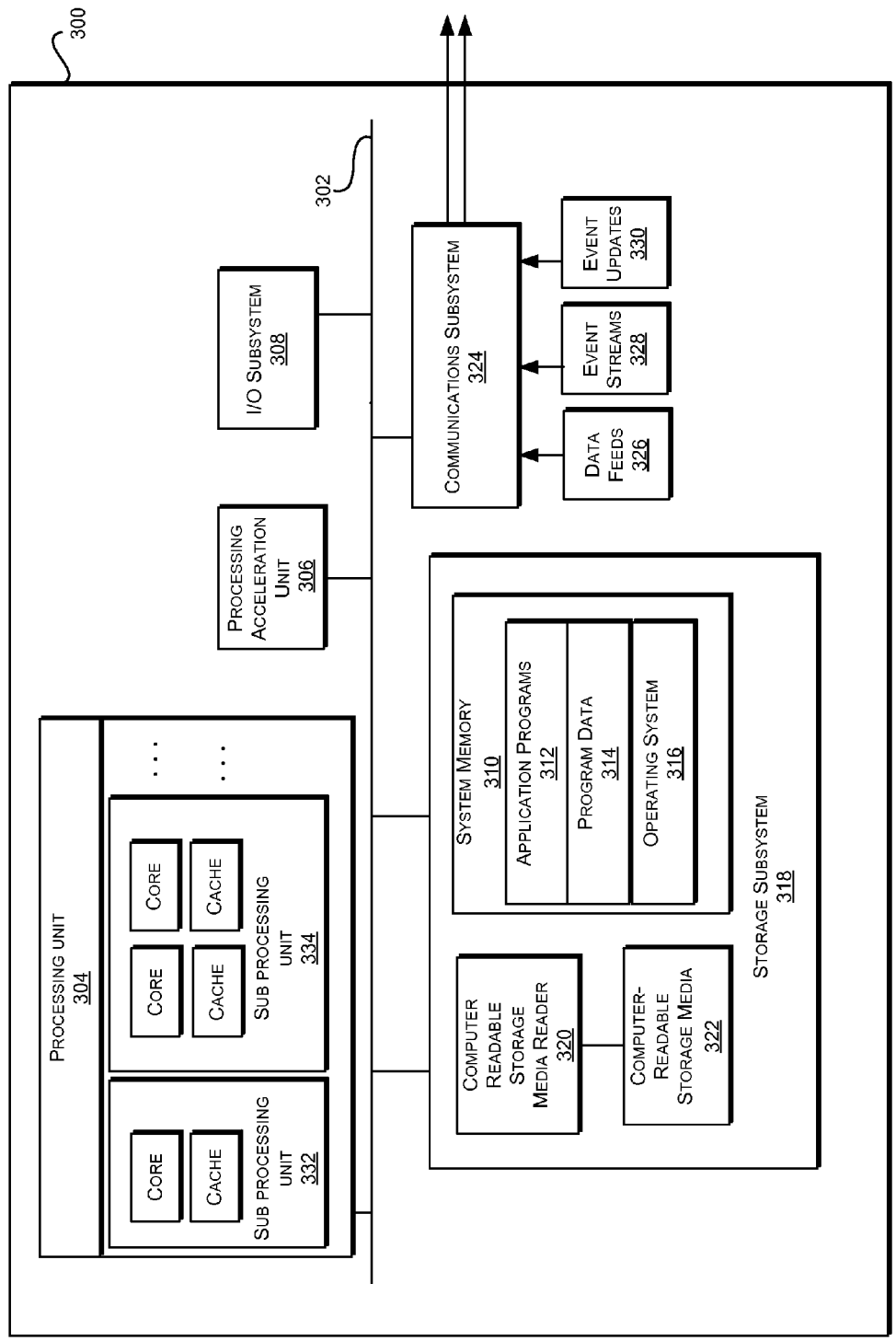
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide systems and methods for implementing process metadata triggers and events. More specifically, embodiments of the present invention allow for process metadata events to be defined and generated, including the program code and/or interfaces that may define the triggering criteria and actions associated with the events. Various embodiments include ongoing evaluations of triggering criteria for events, including criteria both internal and external to an enterprise system, and generating new event occurrences based on the evaluations of triggering criteria. As used herein, a "process metadata event" or "event" may refer to an object implemented with dedicated hardware and/or software that defines at least a set of programmatic actions to be performed and a set of trigger criteria for performing the actions. An "event occurrence" may refer to a separate object that corresponds to a specific instantiation of an event, for example, an object created with dedicated hardware and/or software in response to determining that the trigger criteria for an event have occurred. Events and event occurrences may be tracked and monitored, and programmatic actions may be initiated in response to the creation or modification of an event or an event occurrence. As discussed in more detail below, such actions may include modification of enterprise system software, the generation and transmission of targeted user notifications, the generation and customization of electronic documents, and the like. Event actions may be specific to the event occurrence and/or to one or more selected users associated with the event occurrence. It should be noted that while described herein as being implemented in enterprise system computing environment, embodiments of the present invention may be equally applicable to other computing environments and other situations. These various different implementations are also considered to be within the scope of the present invention.

Figure 4:
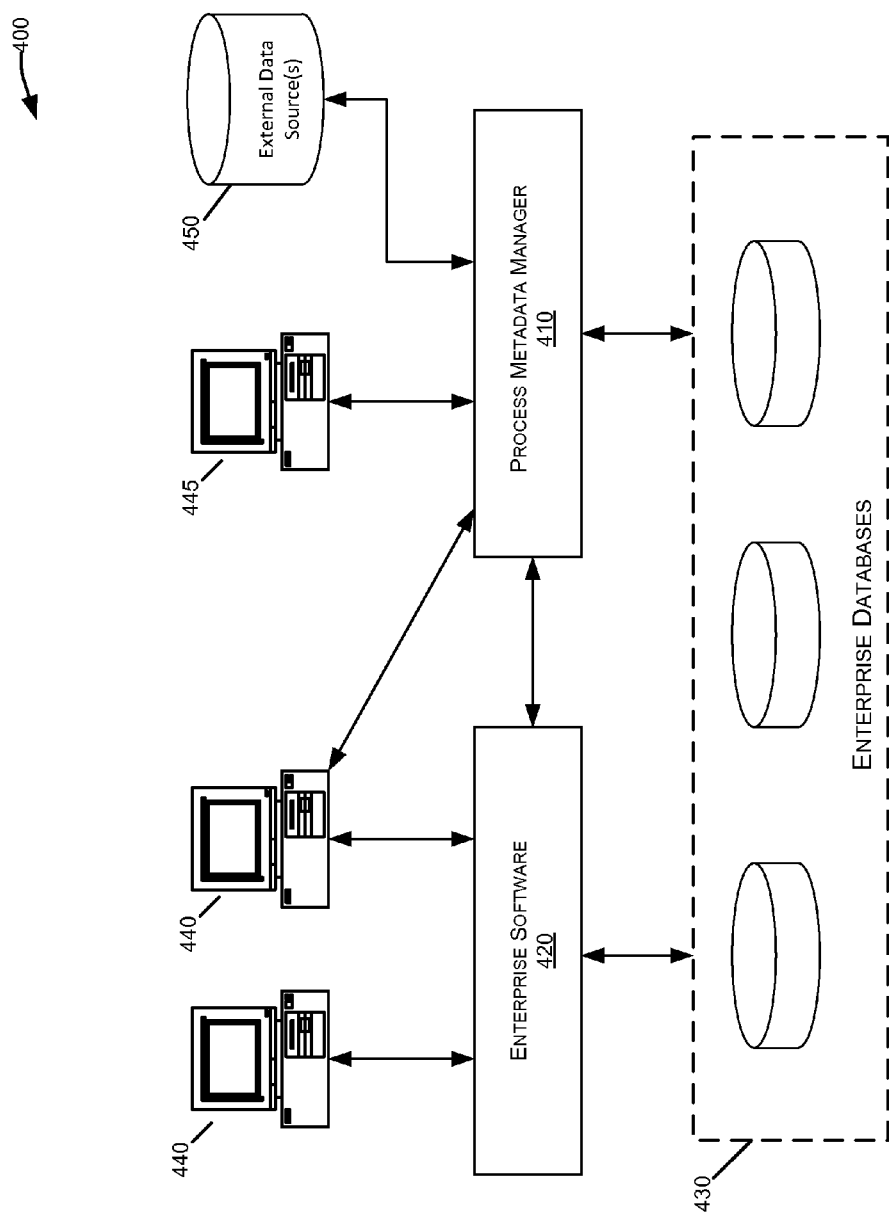
FIG. 4 is a block diagram illustrating, at a high-level, components of a system for implementing process metadata triggers and events in which embodiments of the present invention may be implemented.

FIG. 4 is a block diagram illustrating components of a system 400 for implementing process metadata triggers and events according to one or more embodiments of the present invention. System 400 illustrated in this example may correspond to a high-level computer architecture of an enterprise or organization that provides computing resources and functionality to various users. Specific examples of system 400 may include, without limitation, enterprise resource planning (ERP) systems, document management systems, eCommerce systems, customer relationship management (CRM) systems, and the like. Thus, system 400 may be built and maintained by an enterprise or other organization, such as an educational institution or governmental office, to provide services to users such as customers, employees, or other organization members. As shown in FIG. 4, the system 400 may be implemented as a multi-tier computer architecture, which may include web-based and/or cloud-based implementations, and in which user devices (e.g., user devices 440 and supervisors/administrator devices 445) are provided data and services from middle-tier software (e.g., enterprise software 420 and process metadata manager 410), and in which data is stored in one or more back-end data repositories (e.g., enterprise databases 430).

Process metadata manager 410 may be implemented in hardware, software, or a combination of hardware and software. As discussed in more detail below, the process metadata manager 410 may interact with one or more enterprise software applications 420 to define, generate, and monitor events and occurrences of events affecting the enterprise software 420 and/or other components of the system 400. In some embodiments, the process metadata manager 410 may be implemented as part of the enterprise software 420 or other middle-tier software applications. For example, the process metadata manager 410 may be a software component executing on the same computer server as one or more enterprise software applications 420. In other embodiments, the process metadata manager 410 may be executed on dedicated hardware and/or software, for example, on a separate computer server that monitors and communicates with multiple different enterprise software applications 420. In some cases, a process metadata manager 410 may be dedicated to a specific enterprise system 400, whereas in other cases, a single process metadata manager 410 may interact with multiple different systems 400 maintained by different organizations. In various embodiments, process metadata manager 410 may be designed and implemented to execute within, or in collaboration with, various types of enterprise software applications 420, for example, multi-user and/or collaborative applications. Such multi-user or collaborative enterprise software applications 420 may include web-based applications, cloud-based applications, small and medium enterprise (SME) mobile applications, and the like. In some embodiments, the enterprise software applications 420 may include dashboard applications or other reporting/monitoring applications designed to interface with one or more external enterprise systems (e.g., payment systems, tracking systems, accounting systems, enterprise resource planning (ERP) systems, shipping systems, inventory management systems, warehouse management systems, etc.). In other cases, certain enterprise software applications 420 may include multi-process management systems configured to monitor and/or control one or more such external systems. As discussed below, events and event occurrences may be tracked and monitored within any of these types of enterprise software applications 420, and programmatic actions may be initiated in response to the creation or modification of an event or an event occurrence.

In the example system 400 shown in FIG. 4, the process metadata manager 410 may create, store, and monitor events and event occurrences. User devices 440 and/or supervisor or administrator devices 445 may communicate with the process metadata manager 410, for example, to allow users to create new events by defining event descriptions, trigger criteria, associated event actions, and the like. For instance, the process metadata manager 410 may provide user interfaces, application programming interfaces (APIs), web services and/or application services that can be accessed from user devices 440 and 445 to allow authorized users to create new events and event occurrences, modify and delete existing events and event occurrences, perform tracking and reporting functions for events and event occurrences, and the like. After one or more events and/or event occurrences are created and activated, the process metadata manager 410 may communicate with enterprise software 420, enterprise databases 430, and/or external data sources 450 to determine when the trigger conditions of an event have occurred. After an event occurrence object is created (e.g., in response to the trigger conditions of an event), the process metadata manager 410 may perform one or more actions associated with the event occurrence object, such as modification of the enterprise software 420, modification of data within the enterprise databases 430 or external databases 450, and/or notifications to user devices 440 and 445.

Figure 5:
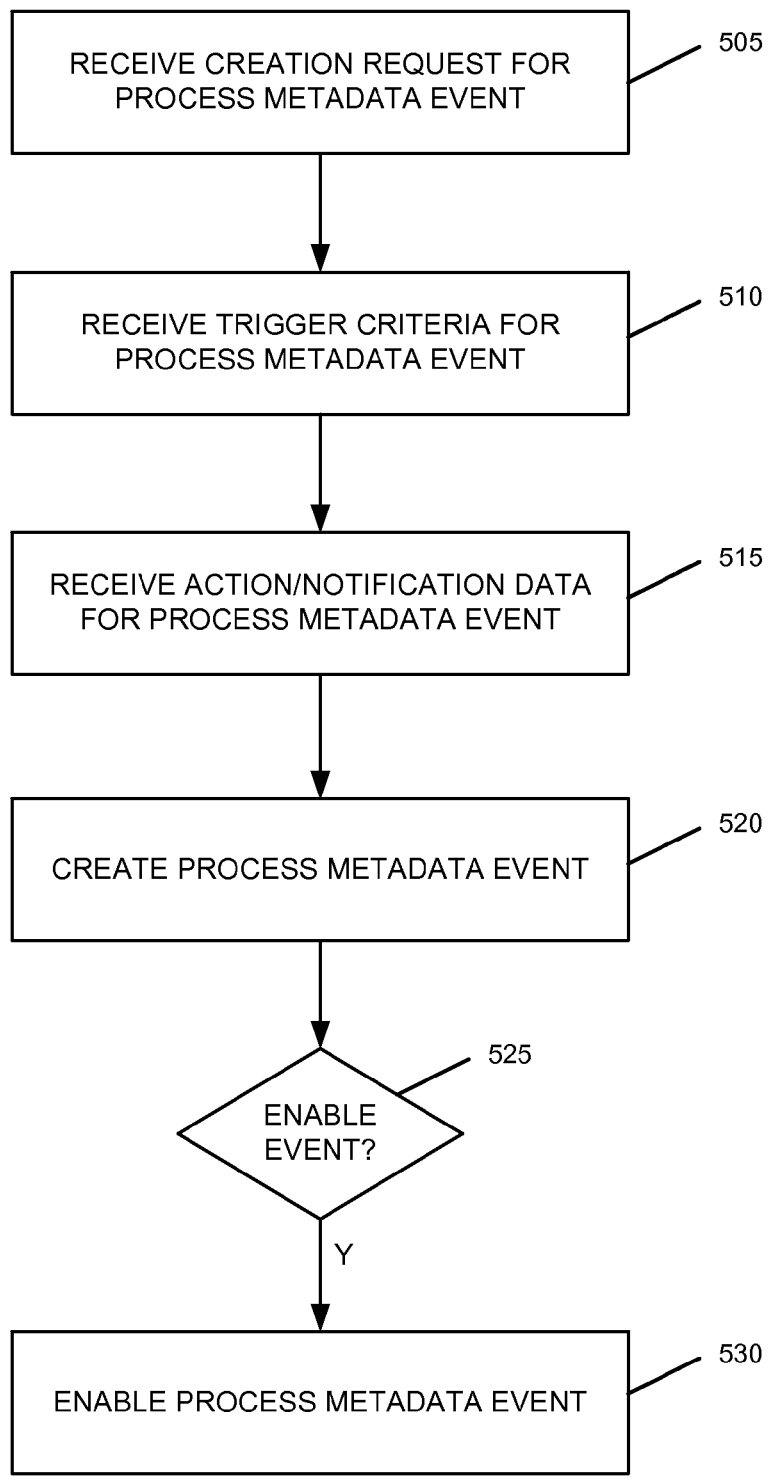
FIG. 5 is a flowchart illustrating a process for creating and enabling a process metadata event, according to one or more embodiments of the present invention.

FIG. 5 is a flowchart illustrating the creation and/or enablement of a process metadata event. As described below, the steps in this process may be performed by one or more components in the example system 400, such as one or more process metadata managers 410 in conjunction with enterprise software 420 and databases 430 and/or various user devices 440 and 445. However, it should be understood that the creation and enablement of process metadata events need not be limited to the specific system and hardware implementations described above in FIGS. 1-4, but may be performed within other hardware and system environments comprising other combinations of the hardware and software components described herein. Further, although the example of FIG. 5 relates to creating new process metadata events, similar processes and techniques may be used to access and modify or delete existing process metadata events via the process metadata manager 410.

In step 505, a request is received to create a new process metadata event. Such requests may be initiated by authorized users, for example, via a user device 440 or supervisor/administrator device 445. For instance, a user device 440 may directly access a user interface (e.g., a web-based interface or standalone client application interface) provided by the process metadata manager 410 to create process metadata events. In other examples, a software application executing on the user device 440 may invoke an API, web service, or application service of the process metadata manager 410 to programmatically create a process metadata event.

In some cases, the functionality to create, modify, and/or delete process metadata events may be restricted to specific devices (e.g., supervisor/administrator devices 445) and/or to specific users (e.g., supervisors, administrators, and/or managers). In other cases, any user with access to the enterprise software 420 (e.g., a multi-user or collaborative application) may be permitted to create, modify, and delete process metadata events via the process metadata manager 410. In certain embodiments, users having different authorization levels may be permitted to create types of different events (e.g., events with different trigger criteria and actions) based on the user's authorization levels. For instance, a user may be permitted to create an event triggered by certain hardware or software states within components that the user is permitted to access, but might not be permitted to create an event triggered by hardware or software states inaccessible to the user.

In step 510, one or more trigger criteria may be received for the new process metadata events to be created. In order to receive the trigger criteria, the process metadata manager 410 may provide an interactive user interface or other software tools (e.g., API functions, web services, etc.) to allow users to construct and combine multiple trigger criteria related to the creation request in step 505. As discussed below, event trigger criteria based on the state of the databases 430 may be stored within the databases 430, similar to other database queries and/or triggers, or may be stored in the memory of the computer server executing the process metadata manager 410.

Various different types of event trigger criteria may be received in step 510. For example, event trigger criteria may be based on the state of the data within one or more of the enterprise databases 430 and/or an action or occurrence within the databases 430. Therefore, event trigger criteria may correspond to database queries or database triggers for one or more of the enterprise databases 430, and may include any of the features and capabilities of database queries, triggers, functions, or the like. For instance, for enterprise systems 400 such as ERP or eCommerce systems, the event trigger criteria may correspond to current data thresholds and/or data changes within the enterprise's sales data, inventory data, process data, customer data, financial data, and/or employee data, etc. As an example, an event trigger criteria received in step 510 may define a minimum inventory level (e.g., in units, dollar amount, days of remaining supply, etc.) for one or more products tracked by the enterprise system 400, so that the event will be triggered when any product's inventory falls below the minimum level. As another example, event trigger criteria may be defined in step 510 to trigger an event whenever a specific type of new data is added the enterprise databases 430 (e.g., a new employee record, a new customer record, a new product order, a new authorized access attempt, etc.). As yet another example, event trigger criteria may be defined in step 510 to trigger an event in response to specific data changes within the enterprise databases 430, such as product orders greater than a certain threshold amount, financial account changes greater than a certain threshold amount, etc. Such threshold trigger criteria may be applied for individual transactions within the databases (e.g., a threshold amount of data changed within a single transaction), or may identify specific time windows (e.g., a threshold amount of data changed within a predetermined number of hour(s), day(s), week(s), month(s), etc.).

Additional types of trigger criteria received in step 510 may be based on the operational states of the hardware, software, and/or network components of the enterprise system 400. For example, the event trigger criteria received in step 510 may identify thresholds (e.g., maximums and/or minimums) for processing loads and availabilities of system servers, thresholds for memory usage, threshold numbers of network connections, and/or thresholds for any other detectable state within the hardware components of the enterprise system 400. Additional event trigger criteria may correspond to various software states occurring within the enterprise software 420, database server software 430, and/or client software executing on devices 440 and 445. For instance, event trigger criteria may be defined corresponding to a threshold number of software objects created, a threshold number of users accessing the software, or any other executing programmable logic (e.g., the results of executing a computer program, sub-routine or function may contribute to the triggering criteria), etc. Event trigger criteria defined in step 510 also may relate network usage and/or network conditions, such as event trigger criteria based on thresholds for network bandwidth within the system 400, number of client connections, occurrences of network congestion, etc. Event trigger criteria may also be defined that correspond to performance metrics of any of the hardware, software, or networks within the system 400, for example, the average response times, throughput, number of successful transactions, and the like.

The event trigger criteria received in step 510 also may include time-based and schedule-based criteria. For example, trigger criteria may identify specific times and days (e.g., 8:00 am every Monday morning, 7:00 pm on each business day, 12:00 am on the first day of every month, etc.), and/or specific time intervals (e.g., every N hours, days, weeks, etc.), on which an event should be triggered. Additional examples of trigger criteria may include data received from external data sources 450, such as data feeds and/or event updates from external servers and databases 450. Such external data sources 450 may include, for example, governmental servers, financial institution servers, educational institution servers, social networking servers, sensor data tools, network performance measuring tools, and the like. Thus, the process metadata manager 410 may create events that are triggered in response to any external conditions as well as, or in addition to, conditions within the enterprise system 400.

The different types of event trigger criteria discussed above may be used separately or in various different combinations. For example, trigger criteria received in step 510 may include a combination of one or more queries of the enterprise databases 430, various thresholds for hardware, software, and network conditions, one or more scheduling criteria, and/or external triggering criteria. For instance, an event to initiate a new inventory order may have a trigger criteria corresponding to a supply database query (e.g., querying current supply tables, unfilled orders tables, etc.) as well as a trigger criteria corresponding to the current market price of one or more commodities (e.g., determined from external financial sources 450) that may be used in determining anticipated product prices, forecasting future orders, etc. As another example, an event to apply to a security software patch have an external event update trigger criteria (e.g., a new security patch release from a third-party software vendor) as well as schedule-based trigger criteria (e.g., apply security patches between 12:00-2:00 am only). In still other examples, an event to perform end-of-month system processing and generate reports may have a schedule-based trigger criteria (e.g., after the close of business on the last day of the month) and one or more a system usage-based trigger criteria (e.g., only execute when system processing load is below 30%, only execute when 10 GB of server memory are available, etc.). As these examples illustrate, any combination of trigger criteria may be identified in 510, including data criteria, system-based criteria, schedule-based criteria, and external criteria, and such criteria may precisely define the conditions under what an event should be triggered. Further, it should be understood that the examples of trigger criteria discussed above are non-limiting, and that various other types and combinations of trigger criteria may be used for implementing embodiments described herein.

In step 515, data may be received defining one or more actions and/or notifications for the new process metadata events to be created. The actions and/or notifications data for new events may be received by the process metadata manager 410 using similar techniques to those described above, for example, such as interactive user interfaces, API functions, web services, etc., from client applications on user devices 440 and 445. The action and/or notification data received in step 515 may correspond to the functions that the process metadata manager 410 will perform in response to the trigger criteria occurring. Such action and/or notification data may include, for example, a set of individuals to be notified when the trigger criteria for the event occurs. For instance, an event may be created to facilitate the performance of specific tasks (or actions), or inform specific groups of individuals that a certain action must be taken. In such examples, the data received from user devices 440-445 may define a list of individuals to be notified when the event trigger criteria occurs, which may take the form of a list of selected individuals, or a set of criteria for qualifying individuals (e.g., positions, titles, roles, groups, departments, access levels, seniority levels, training qualifications, etc.) from which the process metadata manager 410 may generate a corresponding list of individuals to be notified. For instance, an event may be created for a task (e.g., enterprise system maintenance, billing report generation, inventory reorder, etc.) that must be performed by a project manager having access credentials to three specific enterprise databases 430, as well as having completed a specific training course related to the task. In this case, in step 515, a user may input either the specific individual names and/or the necessary set of qualifications, so that the appropriate set of individuals will be notified to perform the task when the event trigger criteria occurs. As discussed below in more detail, the notifications to the individuals identified in step 515 may be performed by the process metadata manager 410, either by modifying the enterprise software 420 to alert the selected individuals and/or by other direct notification techniques (e.g., email, phone, text message, etc.).

The action and/or notification data received in step 515 also may include data identifying one or more functions to be invoked within the enterprise software 420, such as report generation functions, system maintenance functions, audit functions, etc. In some embodiments, the action and/or notification data may define one or more external communications to be sent by the process metadata manager 410, for example, orders or other requests to be transmitted to third-party vendors, account statements to be sent to customers, information to be sent to certain employees, etc.

As discussed in more detail below, when an event trigger criteria occurs, the process metadata manager 410 may be configured to automatically perform a set of event actions and/or to notify selected individuals to perform additional actions. In some embodiments, the process metadata manager 410 may notify a set of selected individuals via the enterprise software 420, and also may generate and/or populate one or more documents to be used by the selected individuals to perform the event actions. In such cases, the event action data received in step 515 may include the identification of the documents to be generated (e.g., a selection of from an existing document template storage, or identifying document templates to be uploaded from the user device 440 or 445), and may include the specifications for generating/populating these document templates when the event trigger criteria occurs.

In step 520, after the trigger criteria for the event have been received (step 510), and the event actions/notifications have been received (step 515), the process metadata manager 410 may create the process metadata event. Referring now to FIG. 6A, an example table is shown listing several illustrative process metadata events. The events listed in FIG. 6A each corresponds to event objects, and each event object may reference one or more associated data objects and/or software objects stored elsewhere within the system 400. In this example, each event listed in FIG. 6A includes an event name and description, which may be provided by the user or client application that requested creation of the event, or may be generated automatically by the process metadata manager 410. The events in this example also include a Boolean enabled field, indication whether or not the event is current enabled (or activated). The events listed in FIG. 6A also include a reference to trigger criteria received and/or generated in step 510, and the event actions received and/or generated in step 515. As shown in this example, event trigger criteria may be stored within the event object as strings (e.g., Event 2) and/or database queries (e.g., Event 4) or other criteria, or the event object may reference associated objects (e.g., Events 1 and 3) such as text files, script files, or markup language files that more detailed and/or combinations of event trigger criteria. Similarly, the event action may be defined in text instructions or a notification list directly within the event object, or the event object may reference one or more executable files or other external instructions to be performed when the event is triggered. Any data objects, such as executable files, scripting files, XML files, or the like, referenced as corresponding to the trigger criteria or action for an event may be uploaded from the user device 440-445 creating the event, or may be automatically generated by the process metadata manager 410 in response to a set of trigger criteria or actions received from the user device 440-445 creating the event.

In step 525, a determination is performed as to whether the newly-created event should be enabled (or activated). In some embodiments, users and/or client applications at user devices 440-445 may specify whether or not an event should be enabled when requesting the creation of the event. New metadata process events also may be enabled or disabled by default after creation in some implementations, or may be enabled/disabled according to a processing schedule determined by the process metadata manager 410. If an event need not be enabled at the current time (525: No), then the event object(s) still may be created within the process metadata manager 410 (and/or elsewhere within the enterprise system 400), but the process metadata manager 410 need not actively monitor for occurrence of the trigger criteria. However, if the event should be immediately enabled (525: Yes), then the process metadata manager 410 will enable the event in step 530 and will immediately begin to monitor the relevant components within the enterprise system 400 (e.g., the enterprise software 420, databases 430, and external data sources 450) to detect the occurrence of the trigger criteria for the event. The event monitoring and event execution processes are discussed below in reference to FIGS. 7 and 8.

Figure 7:
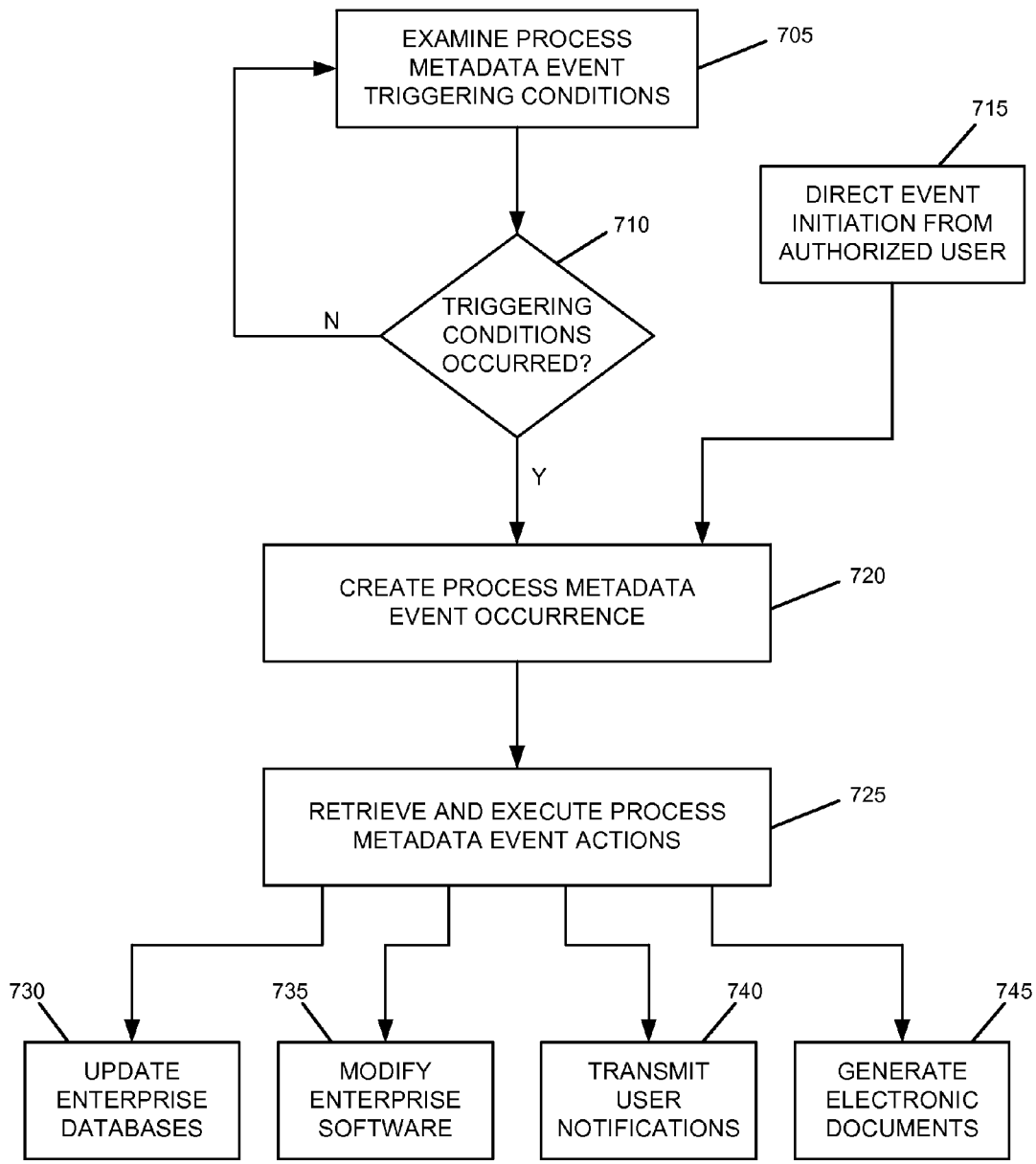
FIG. 7 is a flowchart illustrating a process for monitoring a process metadata event and generating a process metadata event occurrence, according to one or more embodiments of the present invention.

FIG. 7 is a flowchart illustrating the monitoring of a process metadata event and the generation of a process metadata event occurrence. The steps in this process may be performed by one or more components in the example system 400, such as one or more process metadata managers 410 in conjunction with enterprise software 420 and databases 430 and/or various user devices 440 and 445. However, it should be understood that the creation of process metadata events occurrences need not be limited to the specific system and hardware implementations described above in FIGS. 1-4, but may be performed within other hardware and system environments comprising other combinations of the hardware and software components described herein.

In step 705, the process metadata manager 410 may monitor and track the trigger criteria for all enabled process metadata events operating within the enterprise system 400. As discussed above in reference to FIG. 5, the trigger criteria for an event may include various different types of criteria, such as criteria based on the state of the data within the enterprise databases 430 (e.g., a database query or trigger), criteria based on the operational state of the hardware, software, or network conditions within the enterprise system 400 (e.g., current processor or memory usage, current number of users connected, current network bandwidth or congestion, etc.), criteria based on data retrieved from external data sources 450 (e.g., third-party data feeds and/or event updates), and/or time-based and schedule-based criteria. Therefore, in order to monitor and track the trigger criteria for one or more process metadata events, the process metadata manager 410 may maintain constant or periodic communication with the other components of the enterprise software 420, enterprise databases 430, various system hardware components, network appliances and network monitoring devices, etc., as well as external data sources 450 and other components outside of the system 400. For instance, the process metadata manager 410 may establish communication with the one or more enterprise software modules 420 via interprocess communication (IPC) interfaces or API calls to identify several current software states, and then compare those software states to trigger criteria for any enabled events. Similarly, the process metadata manager 410 may setup and receive status data transmissions, alerts, and notifications from the hardware and network devices within the system 400, and compare the current hardware operational data and network status to the trigger criteria for the enabled events. The process metadata manager 410 also may use database client software to periodically query the current state of the enterprise databases 430, or may setup database triggers, functions, and the like within the databases 430 to receive data updates, and may compare the current state of the databases 430 to the trigger criteria for the enabled events. Similar techniques may be used to retrieve data from external data sources 450, including database triggers, data feed subscriptions, and the like, and comparing the data received from the external data sources 450 to the trigger criteria for the enabled events. Finally, the process metadata manager 410 may implement time-based and/or schedule-based functions that initiate any of the above queries or data retrieval and analysis processes, depending on the specific time or schedule criteria of the enabled process metadata events.

In step 710, the process metadata manager 410 may determine if the trigger criteria for one or more enabled events has occurred. As noted above, a single process metadata event may have multiple different trigger criteria, including different types of criteria based on different hardware, software, network, and/or data conditions, along with various scheduling or time criteria. In some embodiments, the process metadata manager 410 may continuously monitor each enabled event and track each of the various trigger criteria for each enabled event, in order to determine in real time that an event's trigger criteria have occurred. In other examples, the process metadata manager 410 may perform such determinations periodically based on a scheduling algorithm, and/or system resource availability, rather than on a continuous basis. Additionally, in some cases, the determination in step 710 may be performed in response to a command issued by an administrator user or an administrative program executing on the process metadata manager 410.

As shown in FIG. 7, if the trigger criteria for an enabled event has occurred (710: Yes), then the process metadata manager 410 will create a process metadata event occurrence in step 720. Additionally, in this example, the creation of a process metadata event occurrence may be prompted by an initiation request received from an authorized user in step 715. For example, a process metadata event may be created to initiate an enterprise-wide data auditing process whenever certain internal and external conditions occur (i.e., the trigger criteria). However, in this example, the process metadata manager 410 may allow an administrator or other authorized user to initiate the data auditing process via a separate command, even if the trigger criteria for the event have not occurred. For instance, the process metadata manager 410 may provide a user interface or programming interface to allow an administrative program or administrator user to initiate any of the process metadata events in the system 400, including both enabled and disabled events.

In step 720, a process metadata event occurrence object is created in response to the occurrence of trigger criteria for an event (step 710) or an initiation request (step 715). Referring now to FIG. 6B, an example table is shown listing several illustrative process metadata event occurrences. Each event occurrence object listed in FIG. 6B corresponds to one of the event objects listed in FIG. 6A, and represents a specific instantiation of the event object in response to the trigger criteria occurring, or in response to a separate request from an authorized user. Therefore, multiple different event occurrence objects may be created for a single event object (e.g., Ev4-1 and Ev4-2 corresponding to Event 4), and these event occurrence objects may be created, tracked, and updated independently from one another. In the example table shown in FIG. 6B, each event occurrence object may include a name/identifier, an associated event object, a creation time, a current status, an associated user, and an update time, along with other associated data fields. As discussed below in more detail, each event occurrence object may have one or more status fields which are maintained and tracked by the process metadata manager 410, along with one or more associated users that may be assigned to perform certain actions associated with the event occurrence object.

In step 725, after (or as part of) the creation of the event occurrence object, the process metadata manager 410 may retrieve and execute the actions of the associated event object. Using the example tables shown in FIGS. 6A-6B, if the process metadata manager 410 determines that the trigger criteria for Event 3 (i.e., the criteria defined in . . . /script2.xml) has occurred, then it may initiate the generation of a new event occurrence object (e.g., Ev3-2). During or after the generation of Ev3-2, the process metadata manager 410 may retrieve and execute the actions associated with the corresponding event object (i.e., the . . . /patch.exe executable for Event 3).

Steps 730-750 in FIG. 7 represent examples of some of the possible actions that may be performed in response to the creation of a new event occurrence object. Not all of the actions in steps 730-750 must be performed when a new event occurrence object is created, and in some cases only one of the actions in steps 730-750 may be performed. For instance, the database function "DBFunc_1" executed when a new event occurrence object is created corresponding to Event 4 may only modify certain data within the enterprise databases 430 in step 735, whereas the executable " . . . /patch.exe" executed when a new event occurrence object is created corresponding to Event 3 may perform multiple or even all of the actions 730, 735, 740, 745, and 750. As discussed above, the actions to be performed when a new event occurrence object is created may be defined by a user when creating the event (e.g., step 515) and/or by the process metadata manager 410 when monitoring and tracking events. Thus, the specific actions performed and not performed in steps 730-750 may be programmed and customized for each different event.

In some cases, the actions associated with creating a new event occurrence object may include modifying the hardware of the enterprise system 400 in step 730. For example, the process metadata manager 410 may execute instructions causing one or more hardware devices or appliances within the system 400 (e.g., computer servers, memory devices, routers, firewalls, and other network devices, etc.) to be disabled, enabled, reconfigured, or rebooted in accordance with the event action. In some embodiments, such as cloud-based system implementations, the process metadata manager 410 also may add, remove, or change the underlying hardware of the system 400, such as creating new servers or server farms, upgrading database servers, and replacing network hardware.

As another example, the actions associated with creating a new event occurrence object may include updating the data within the enterprise databases hardware of the enterprise system 400 in step 735. For instance, in an enterprise system 400 corresponding to an ERP system, CRM system, eCommerce system, or the like, event actions may include analyzing and modifying the enterprise's sales data, inventory data, process data, customer data, financial data, employee data, and the like. Such database modifications may include report generation, data integrity checks, and data audits.

The actions associated with creating a new event occurrence object also may include modifying the enterprise software 420 in step 740. For example, the process metadata manager 410 may cause the enterprise software 420 to provide a modified user interface to specific users of the enterprise software 420, in response to the creation of the new event occurrence object. For instance, if an event action includes a specified list of individuals that should be notified and/or provided with event-related information and functionality, then the process metadata manager 410 may employ the user interfaces of the enterprise software to notify and the inform selected users. Thus, when a new event occurrence object is created, the set of users to be notified may receive on-screen alerts, inbox messages, flashing event indictors, and/or other types of notifications the next time they login to the enterprise software 420 (or immediately if the users are already logged in). As discussed below in more detail, the modifications to the enterprise software 420 in step 740 also may provide additional functionality to the notified users via the enterprise software 420, such as the abilities to select (or "pick-up") and deselect (or "drop") an event occurrence, to retrieve and analyze additional data regarding the cause of the event occurrence, and to perform any of the actions associated with the event occurrence.

Additional examples of modifications to the enterprise software 420 in step 740 may include initiating processes or functions within the software 420 (e.g., via API calls or IPC) in order to enable or disenable various features of the software 420, generate, process, or transmit system data, or perform maintenance on the software 420 by installing an upgrade, security patch, or the like. In some cases, modifying the enterprise software 420 in step 740 may involve modifying the programming code of the enterprise software 420, and may include recompiling, linking, and/or deploying the modified code. Alternatively, or additionally, the modifying the enterprise software 420 may involve modifying the application data of the enterprise software 420 or other data accessed by the enterprise software 420, and/or invoking software function calls or hooks, to cause changes in the execution and outputs of the software 420. For instance, a list of users to be notified and provided with event-related information and functionality may be transmitted to the enterprise software 420 by writing the user names into the application memory, or a database table accessed by the enterprise software 420, or by calling an application function to provide the list of users and related event information to the enterprise software 420.

The actions associated with creating a new event occurrence object also may include transmitting notifications to one or more user devices step 745. As discussed above, some event actions may include specified lists of individuals that should be notified and/or provided with event-related information in response to the creation of an event occurrence. Instead of, or in addition to, notifying users via the enterprise software 420 (step 740), users may also be notified outside the enterprise software 420 via direct notifications transmitted by the process metadata manager 410 to the appropriate user devices 440. Such notifications may include emails, text messages, instant messaging messages, phone calls, etc. In some cases, notifications may be transmitted to user devices 440 in step 745 for occurrences of urgent or critical event occurrences, and corresponding notifications and information may be provided via the enterprise software 420 in step 740 in order to inform the specified users as soon as possible.

As yet another example, the actions associated with creating a new event occurrence object may include generating and/or populating a set of new electronic documents in step 750. Such documents may include, for example, product order forms, issue tracking forms (e.g., electronic trouble tickets) and other documents related to the enterprise system 400. In some cases, the event action may define the set of documents to be generated for a new event occurrence, and one or more specific fields of the documents that may be automatically populated to be customized for the event and/or the specific event occurrence based on the trigger criteria. For instance, an inventory reorder event may have a set of designated product reorder forms that may be generated and populated automatically by the process metadata manager 410, depending on the specific product that triggered the event. That is, a detection of a low inventory for Product A may trigger the generation of Product A reorder forms, including populating the forms with Product A supplier information, price and quantity information, product-specific quality and shipping specifications, etc., whereas a detection of a low inventory for Product B may trigger the generation of a different set of electronic forms and a different methodology used to populate the forms. As another example, a detection of a hardware failure within the system 400 may trigger the generation of a maintenance request and trouble ticket, which may be automatically populated by the process metadata manager 410 with the hardware specifications, failure details, hardware history and previous maintenance, etc. As discussed below, the process metadata manager 410 also may generate and/or populate specific electronic documents and fields based on the user that picks-up an event occurrence via the enterprise software 420.

Figure 8:
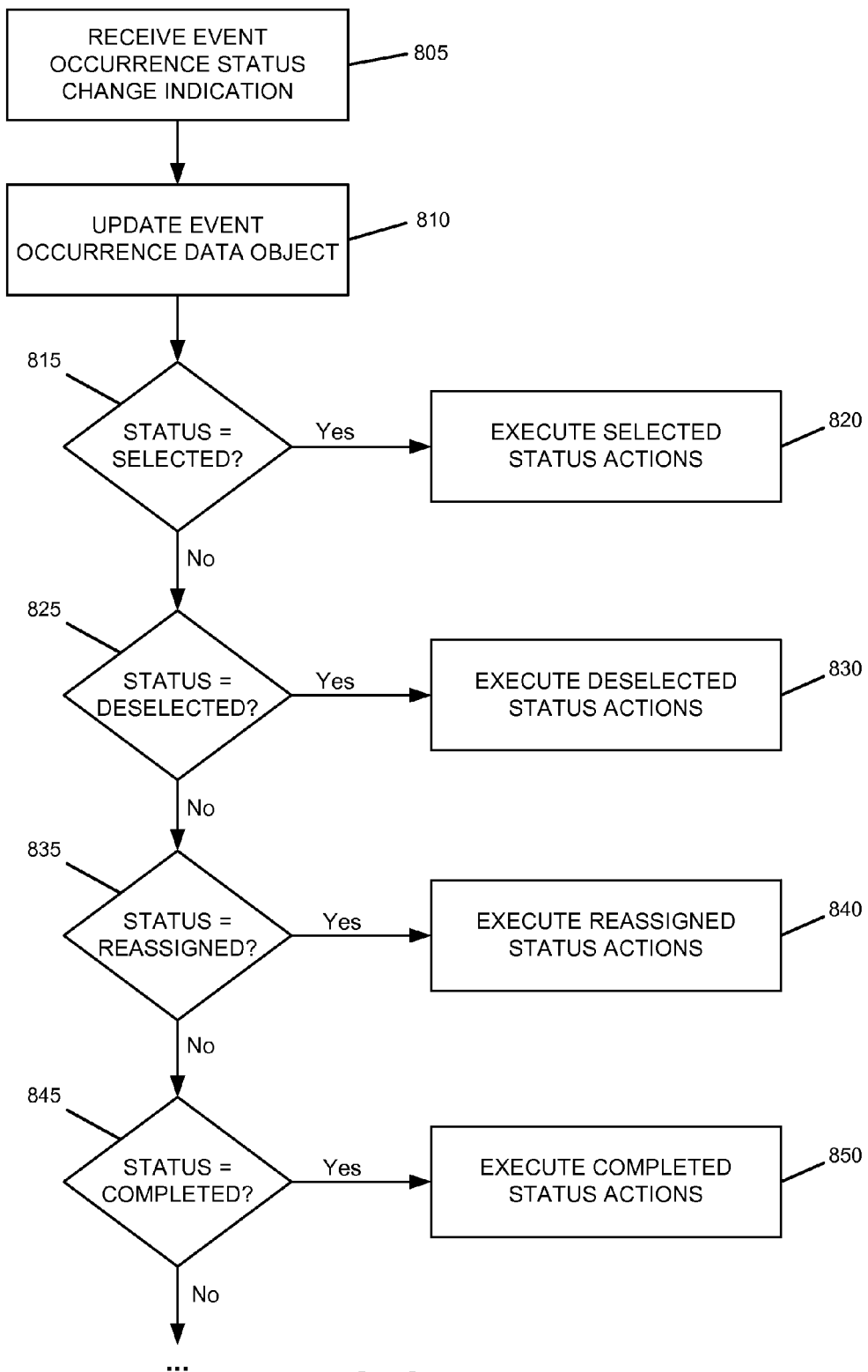
FIG. 8 is a flowchart illustrating a process for monitoring and updating a process metadata event occurrence, according to one or more embodiments of the present invention.

FIG. 8 is a flowchart illustrating a process of monitoring and updating a process metadata event occurrence. The steps in this process may be performed by one or more components in the example system 400, such as one or more process metadata managers 410 in conjunction with enterprise software 420 and databases 430 and/or various user devices 440 and 445. However, it should be understood that the monitoring and updating of process metadata events occurrences not be limited to the specific system and hardware implementations described above in FIGS. 1-4, but may be performed within other hardware and system environments comprising other combinations of the hardware and software components described herein.

In step 805, the process metadata manager 410 may receive an indication of a status change in an event occurrence object. In some cases, such indications may be received from the enterprise software 420 in response to a user action within the software 420 related to the event. For example, as discussed above, one or more selected users may be notified within the enterprise software 420 (e.g., via on-screen alerts, inbox messages, event indicator lights, etc.) that an event occurrence is available that may be selected (or picked-up) by any of the notified users. In such cases, the enterprise software 420 may allow the notified users to pick-up the event occurrence (e.g., by clicking or tapping the on-screen indicator and confirming that the user will pick up the event occurrence), and in response the enterprise software 420 may transmit this information to the process metadata manager 410 in the form of a status change indicator for the event occurrence. Status change indicators may correspond to users selecting events occurrences via the enterprise software 420, or other user actions such as deselecting (or "dropping"), editing, reassigning, and closing (or "resolving") the event occurrence. In these examples, the process metadata manager 410 may receive a status change indication anytime an event occurrence is updated via the enterprise software 420 identifying the event occurrence, the updating user, the updated status of the event occurrence, and/or other data related to the event or event occurrence to be updated.

As noted above, the process metadata manager 410 may receive indications of status changes in event occurrence objects in response to user actions performed via the enterprise software 420. However, in some embodiments, indications of status changes in event occurrence objects may be received from different components within an enterprise system 400 and/or may be determined solely by the process metadata manager 410. For instance, the process metadata manager 410 may provide interfaces for allow user devices 440 and/or an administrator/supervisor devices 445 to transmit indication of a status change for an event occurrence object directly to the process metadata manager 410, without interacting with the enterprise software 420. In other examples, the process metadata manager 410 may determine status changes in event occurrence objects by periodically re-evaluating some or all of the trigger criteria that caused the event occurrence object to be created. For instance, if the creation of an event occurrence object was triggered by a hardware failure, network congestion, low database disk space, low product inventory, etc., then the process metadata manager 410 may periodically reevaluate the trigger criteria to determine if the situation that triggered the event is being addressed or has already been resolved.

In step 810, the process metadata manager 410 may update the event occurrence data object to reflect the change in status. Referring again to the example table in FIG. 6B, the process metadata manager 410 may update fields such as the status field, user field, and updated time field to reflect the new status of the event occurrence object. In other examples, event occurrence data objects may have additional fields that track the object's previous statuses and all previous users that have updated the object's status, as well as comment fields and other information that users may provide as input/explanation when updating the status of an event occurrence data object.

Steps 815-850 illustrate a series of different actions that the process metadata manager 410 may execute in relation to an updated event occurrence data object, depending on the new status of the updated object. It should be understood that these examples of status changes and corresponding event actions in FIG. 8 are illustrative only, and that different statuses and corresponding event actions may be defined in different enterprise system implementations. In this example, the possible actions to be executed by the process metadata manager 410 (e.g., steps 820, 830, 840, and 850) may be different from one another, meaning that the actions performed in response to a status change may depend on the specific event occurrence and/or the new status of the event occurrence. In some embodiments, these status-dependent actions may be defined by the user for each event. For example, in addition to the "Actions" column in FIG. 6A that defines the set of actions to be performed with the event is triggered, an event may also include separate sets of action data (e.g., executables, script files, database functions, etc.) for each possible status change that may occur for the event occurrence.

In step 815, if the status of the event occurrence data object has been changed to "Selected" (815: Yes), indicating that a user has picked up the event occurrence, then the process metadata manager 410 may execute a set of actions corresponding to the "Selected" status in step 820. For example, the process metadata manager 410 may modify the enterprise software 420 to lock (and/or hide) this event occurrence so that it cannot be selected (and/or seen) by other users. As discussed above in reference to step 740, modifying the enterprise software code by involve the process metadata manager 410 modifying the programming code of the enterprise software 420, modifying the application data or other external data accessed by the enterprise software 420, and/or invoking exposed software functions of the enterprise software 420 to change the appearance and functionality of the software for various different used. In this case, the modification of the enterprise software 420 may cause the event occurrence to appear as locked, or to not appear at all, to the other users of the enterprise software 420 that were initially notified when the event occurrence was created. Therefore, only the user that picked up the event occurrence will be able to subsequently view and/or modify the event occurrence using the enterprise software 420.

Additional actions performed by the process metadata manager 410 in step 820 may include generating and/or populating specific electronic documents based on the user that picked up the event occurrence. Such documents may be automatically generated and populated with the user's personal information (e.g., name, title, contact information, etc.) as well as based on the user's role, department, level of experience, etc. Other actions may include the process metadata manager 410 providing the user that picked up the event occurrence with additional data that may be needed by the user to complete or resolve the event occurrence. For instance, the user may be granted access to view the electronic data records that caused triggered the event, or may be provided with data relating to previous occurrences of the same event having similar characteristics.

In step 825, if the status of the event occurrence data object has been changed to "Deselected" (825: Yes), then the process metadata manager 410 may execute a set of actions corresponding to the "Deselected" status in step 830. The change in status to "Deselected" in this case may indicate that the user was unable to complete or resolve the event occurrence, for instance, because the user lacked the time or technical expertise to perform the required actions. In this example, the process metadata manager 410 may modify the enterprise software 420 to unlock this event occurrence and may re-notify the set of users that were initially notified when the event occurrence was first created, allowing these users to once again view and pick-up the event occurrence. In some cases, the process metadata manager 410 may change or narrow the list of users to notify. For example, if the user that deselects the event occurrence indicates via the enterprise software 420 that a higher level of technical expertise will be required to perform the required actions, then the process metadata manager 410 might only notify a narrowed set of users that possess the technical expertise to perform the actions.

The change in status to "Deselected" in step 825 may also be initiated by the process metadata manager 410 in certain embodiments. For example, if a predetermined period of time has passed after a user has picked-up an event occurrence without the user deselecting, reassigning, modifying, and/or resolving the event occurrence, then the process metadata manager 410 may automatically deselect or reassign the event occurrence.

In step 835, if the status of the event occurrence data object has been changed to "Reassigned" (835: Yes), then the process metadata manager 410 may execute a set of actions corresponding to the "Reassigned" status in step 840. The change in status to "Reassigned" in this case may indicate that the user was unable to complete or resolve the event occurrence, but identified another user that may be able to do so. In this case, the process metadata manager 410 may perform similar steps to those discussed above in step 820. For example, the process metadata manager 410 may modify the enterprise software 420 to notify the reassigned user, lock and/or hide the event occurrence for all other users, generate and populate electronic documents for the reassigned user, and/or provide the reassigned user with other information that may be used to perform the actions required for the event occurrence.

In step 845, if the status of the event occurrence data object has been changed to "Completed" (845: Yes), then the process metadata manager 410 may execute a set of actions corresponding to the "Completed" status in step 850. The change in status to "Completed" may indicate that the user successfully performed or verified any of the associated actions required for the event occurrence. In this case, the process metadata manager 410 may execute one or more actions to verify the completion of the event occurrence, update or remove the event occurrence data object, and/or archive the event occurrence records for subsequent search and analysis tasks. For example, after a user changes an event occurrence status to completed, the process metadata manager 410 may initially perform an automated confirmation process to verify that the event occurrence was successfully completed or resolved. Such automated confirmation processes may be event-dependent and might not be used for some events. However, certain event occurrences may have verifiable outcomes that can be confirmed by the process metadata manager 410. For instance, if an event occurrence was created as a result of a hardware failure, network congestion, low database disk space, low product inventory, etc., then the process metadata manager 410 may be able to poll the system hardware devices, communicate with the software components, and/or query the system databases 430 to confirm that the conditions that triggered the event have been resolved.

After confirming that the event occurrence has been completed or resolved, the process metadata manager 410 may update the appropriate data objects (e.g., an event occurrence record in FIG. 6B) to modify or remove the record of the event occurrence. The enterprise software 420 may also be modified so that the event occurrence will be hidden or locked from all users that have been previously notified of or permitted access to the event occurrence. Finally, a record of the completed event occurrence may be created and archived, including the records of the data or other conditions that triggered the creation of the event occurrence, the creation time, completion time, and modification times for the event occurrence, the users notified, the user(s) that picked up, modified, and completed the event occurrence, and other event occurrence data. The archived data records of completed event occurrences may allow the process metadata manager 410 to generate and analyze performance metrics for event occurrences, such as event resolution rates and times, user resolution rates and times, reassignment or deselection rates for events and users, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for generating an event occurrence object, the method comprising:
    determining, by a process metadata manager computer system, that one or more software trigger criteria have occurred, the software trigger criteria associated with a first event software object supported by a multi-user software application;
    in response to determining that the software trigger criteria have occurred, initiating a instantiation of the first event software object, thereby generating a first event occurrence software object;
    determining, by the process metadata manager computer system, a plurality of users associated with the first event occurrence software object;
    performing a first modification of the multi-user software application, by the process metadata manager computer system, to permit selection via user interfaces of the multi-user software application, of the first event occurrence software object, by the determined plurality of users associated with the first event occurrence software object, wherein performing the first modification includes preventing at least one other user of the multi-user software application from selecting the first event occurrence software object via the user interfaces of the multi-user software application;
    determining, by the process metadata manager computer system, that a first user of the plurality of users associated with the first event occurrence software object has selected the first event occurrence software object via the user interfaces of the multi-user software application; and
    in response to determining that the first user has selected the first event occurrence software object, performing a second modification of the multi-user software application, by the process metadata manager computer system, to prevent selection of the first event occurrence software object by any other users of the plurality of users associated with the first event occurrence software object, via the user interfaces of the multi-user software application.

2. The method of claim 1, wherein determining that the software trigger criteria associated with the first event software object have occurred comprises:
    querying a database associated with the multi-user software application; and
    comparing results of the query with a plurality of trigger criteria corresponding to a plurality of different event software objects, including the first event software object.

3. The method of claim 1, wherein determining that the software trigger criteria associated with the first event software object have occurred comprises:
    receiving an electronic communication from a user authorized to initiate event occurrences, the electronic communication identifying the first event software object; and
    generating the first event occurrence software object as an occurrence of the first event software object, in response to the electronic communication.

4. The method of claim 1, wherein determining that the software trigger criteria associated with the first event software object have occurred comprises:
    retrieving scheduling criteria for generating the first event occurrence software object;
    periodically polling one or more computer hardware resources associated with the multi-user software application, in accordance with the retrieved scheduling criteria; and
    generating the first event occurrence software object based on results of the periodically polling one or more computer hardware resources, and based on the retrieved scheduling criteria.

5. The method of claim 1, further comprising:
    determining that the first user has deselected the first event occurrence software object via the user interfaces of the multi-user software application; and
    in response to determining that the first user has deselected the first event occurrence software object, performing a third modification of the multi-user software application to permit selection of the first event occurrence software object by any other users of the plurality of users associated with the first event occurrence software object.

6. The method of claim 1, further comprising:
    receiving an indication that the first user has completed an action associated with the first event occurrence software object; and
    in response to receiving the indication, removing the first event occurrence software object from a list of active event occurrence objects associated with the multi-user software application.

7. The method of claim 1, further comprising:
    determining that an action associated with the first event occurrence software object has not been completed within a predetermined time period following the selection of the first event occurrence software object by the first user; and
    in response to said determination, performing a modification of the multi-user software application to permit selection of the event occurrence object by any other users of the plurality of users associated with the first event occurrence software object.

8. The method of claim 1, wherein performing the first and second modifications of the multi-user software application comprises:
    modifying, by the process metadata manager computer system, programming code of the multi-user software application during execution of the multi-user software application.

9. The method of claim 1, wherein performing the first and second modifications of the multi-user software application comprises:
    invoking, by the process metadata manager computer system, one or more exposed software functions of the multi-user software application.

10. A system comprising:
a processor; and
a memory coupled with and readable by the processor and storing therein a set of instructions which, when executed by the processor, causes the processor to generate an event occurrence object by:
   determining that one or more software trigger criteria have occurred, the software trigger criteria associated with a first event software object supported by a multi-user software application;
   in response to determining that the software trigger criteria have occurred, initiating a instantiation of the first event software object, thereby generating a first event occurrence software object;
   determining a plurality of users associated with the first event occurrence software object;
   performing a first modification of the multi-user software application to permit selection via user interfaces of the multi-user software application, of the first event occurrence software object, by the determined plurality of users associated with the first event occurrence software object, wherein performing the first modification includes preventing at least one other user of the multi-user software application from selecting the first event occurrence software object via the user interfaces of the multi-user software application;
   determining that a first user of the plurality of users associated with the first event occurrence software object has selected the first event occurrence software object via the user interfaces of the multi-user software application; and
   in response to determining that the first user has selected the first event occurrence software object, performing a second modification of the multi-user software application to prevent selection of the first event occurrence software object by any other users of the plurality of users associated with the first event occurrence software object, via the user interfaces of the multi-user software application.

11. The system of claim 10, wherein determining that the software trigger criteria associated with the first event software object have occurred comprises:
   querying a database associated with the multi-user software application; and
   comparing results of the query with a plurality of trigger criteria corresponding to a plurality of different event software objects, including the first event software object.

12. The system of claim 10, wherein determining that the software trigger criteria associated with the first event software object have occurred comprises:
   receiving an electronic communication from a user authorized to initiate event occurrences, the electronic communication identifying the first event software object; and
   generating the first event occurrence software object as an occurrence of the first event software object, in response to the electronic communication.

13. The system of claim 10, wherein determining that the software trigger criteria associated with the first event software object have occurred comprises:
   retrieving scheduling criteria for generating the first event occurrence software object;
   periodically polling one or more computer hardware resources associated with the multi-user software application, in accordance with the retrieved scheduling criteria; and
   generating the first event occurrence software object based on results of the periodically polling one or more computer hardware resources, and based on the retrieved scheduling criteria.

14. The system of claim 10, the memory storing therein further instructions which, when executed by the processor, causes the processor to:
   determine that the first user has deselected the first event occurrence software object via the user interfaces of the multi-user software application; and
   in response to determining that the first user has deselected the first event occurrence software object, perform a third modification of the multi-user software application to permit selection of the first event occurrence software object by any other users of the plurality of users associated with the first event occurrence software object.

15. The system of claim 10, the memory storing therein further instructions which, when executed by the processor, causes the processor to:
   receive an indication that the first user has completed an action associated with the first event occurrence software object; and
   in response to receiving the indication, remove the first event occurrence software object from a list of active event occurrence objects associated with the multi-user software application.

16. The system of claim 10, the memory storing therein further instructions which, when executed by the processor, causes the processor to:
   determine that an action associated with the first event occurrence software object has not been completed within a predetermined time period following the selection of the first event occurrence software object by the first user; and
   in response to said determination, perform a modification of the multi-user software application to permit selection of the event occurrence object by any other users of the plurality of users associated with the first event occurrence software object.

17. A computer-readable memory comprising a set of instructions stored therein which, when executed by a processor, causes the processor to generate an event occurrence object by:
   determining that one or more software trigger criteria have occurred, the software trigger criteria associated with a first event software object supported by a multi-user software application;
   in response to determining that the software trigger criteria have occurred, initiating a instantiation of the first event software object, thereby generating a first event occurrence software object;
   determining a plurality of users associated with the first event occurrence software object;
   performing a first modification of the multi-user software application to permit selection via user interfaces of the multi-user software application, of the first event occurrence software object, by the determined plurality of users associated with the first event occurrence software object, wherein performing the first modification includes preventing at least one other user of the multi-user software application from selecting the first event occurrence software object via the user interfaces of the multi-user software application;

determining that a first user of the plurality of users associated with the first event occurrence software object has selected the first event occurrence software object via the user interfaces of the multi-user software application; and in response to determining that the first user has selected the first event occurrence software object, performing a second modification of the multi-user software application to prevent selection of the first event occurrence software object by an other users of the plurality of users associated with the first event occurrence software object, via the user interfaces of the multi-user software application.

18. The computer-readable memory of claim 17, comprising further instructions stored therein which, when executed by a processor, causes the processor to:

determine that the first user has deselected the first event occurrence software object via the user interfaces of the multi-user software application; and in response to determining that the first user has deselected the first event occurrence software object, perform a third modification of the multi-user software application to permit selection of the first event occurrence software object by any other users of the plurality of users associated with the first event occurrence software object.

19. The computer-readable memory of claim 17, comprising further instructions stored therein which, when executed by a processor, causes the processor to:

receive an indication that the first user has completed an action associated with the first event occurrence software object; and in response to receiving the indication, remove the first event occurrence software object from a list of active event occurrence objects associated with the multi-user software application.

20. The computer-readable memory of claim 17, comprising further instructions stored therein which, when executed by a processor, causes the processor to:

determine that an action associated with the first event occurrence software object has not been completed within a predetermined time period following the selection of the first event occurrence software object by the first user; and in response to said determination, perform a modification of the multi-user software application to permit selection of the event occurrence object by any other users of the plurality of users associated with the first event occurrence software object.

* * * * *

UNITED STATES PATENT AND TRADEMARK OFFICE
CERTIFICATE OF CORRECTION

PATENT NO. : 9,984,111 B2
APPLICATION NO. : 14/681388
DATED : May 29, 2018
INVENTOR(S) : Fillipi et al.

It is certified that error appears in the above-identified patent and that said Letters Patent is hereby corrected as shown below:

In the Drawings

On sheet 6 of 8, in FIG. 6B, Line 2, delete "INDENTIFER" and insert -- IDENTIFIER --, therefor.

In the Claims

In Column 33, Line 13, in Claim 17, delete "an" and insert -- any --, therefor.

Signed and Sealed this
Twenty-ninth Day of January, 2019

Andrei Iancu
*Director of the United States Patent and Trademark Office*